…

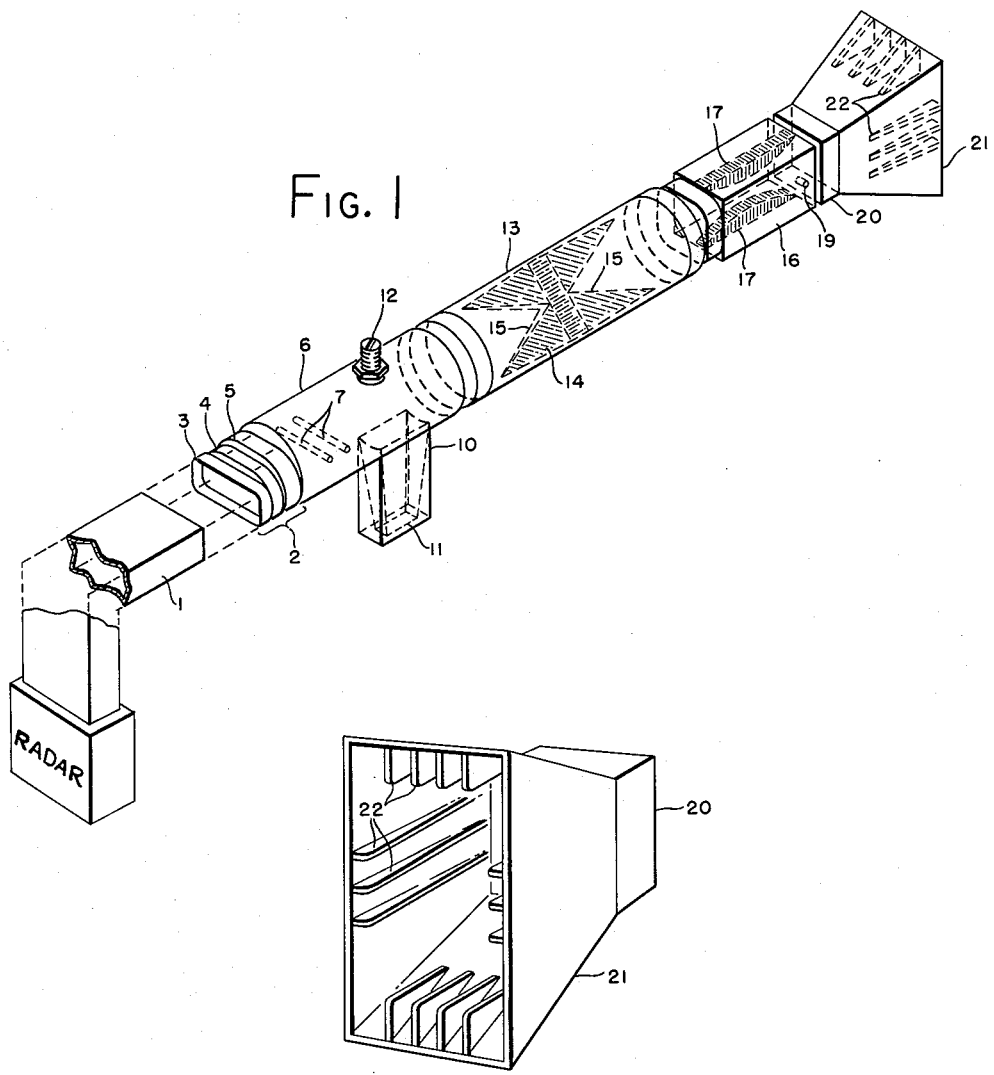

United States Patent Office 3,031,661
Patented Apr. 24, 1962

3,031,661
MICROWAVE ANTENNA FEED FOR CIRCULAR POLARIZATION
Alvin William Moeller and Edgar G. Shelor, Jr., Baltimore, Md., assignors to The Bendix Corporation, Towson, Md., a corporation of Delaware
Filed Oct. 31, 1956, Ser. No. 619,492
9 Claims. (Cl. 343—100)

This invention relates to an antenna feeding means adapted to emit and accept circularly polarized waves of one sense of rotation and to reject waves of the opposite sense of rotation.

Radar systems other than those for weather detection are adversely affected in their ability to detect targets by returns from precipitation. Techniques based on various differences between the responses of rain drops and other targets to radar illumination have been tried. One of the most promising is the use of circularly polarized energy transmitted by an antenna feeding system which will emit and accept circularly polarized energy of one sense of rotation, but will reject waves of the opposite sense of rotation. This technique is based upon the distinction that raindrops are symmetrical, whereas the configuration of wanted targets is asymmetrical. For this reason, circularly polarized energy reflected from raindrops will be circularly polarized with a sense of rotation opposite to that of the incident wave and will be rejected by the feed system. On the other hand, energy reflected from an asymmetrical target will be elliptically polarized. An elliptically polarized wave is composed of two wave components, circularly polarized, but having opposite directions of rotation and different amplitudes. The component having the same sense of rotation as the incident wave will be accepted by the feed system, while the other component will be rejected.

Following the above technique, feed assemblies capable of distinguishing satisfactorily between precipitation and other targets have been developed but the frequency range of these systems was quite small, necessitating retuning for any considerable change in frequency of the radar energy.

It is an object of this invention to provide a feed system for a microwave antenna which will emit and accept circularly polarized waves of one sense of rotation, but will reject waves of the opposite sense of rotation and will accomplish these results over a broad band of frequencies without the necessity for retuning.

It is another object of the invention to provide, as a part of the feed system, a feed horn which provides the same pattern regardless of the polarization of the wave being fed.

These and other objects and advantages of the invention are realized by a feed system comprising a section for converting the $TE_{01}$ mode in rectangular waveguide to the $TE_{11}$ mode in circular waveguide with the electric vector vertical. This is followed by a cylindrical propagation section having two horizontal shorting bars, a quarterwave apart, and a shunt arm terminating in a dissipative load, and positioned to couple horizontally polarized energy out of the section. Following this section is a rotatable polarizing section containing an axially disposed dielectric slab which may be positioned with its plane at a 45° angle to the vertical. Next comes a square section with phase shifting ridges on the upper and lower walls and this is joined to a horn. The walls of the horn are provided with fins to change the feed aperture as a function of polarization.

In the drawings:

FIG. 1 is a perspective view of a feeding system embodying the invention, showing the interior configuration thereof in dashed lines; and, FIG. 2 is a perspective view of the feed horn of the assembly of FIG. 1.

Referring more particularly to the drawing, the assembly shown in FIG. 1 comprises an input section 1 of rectangular waveguide in which energy of the $TE_{01}$ mode is applied to the feeding system. This section is joined to a triple step transition unit 2 having its interior formed into three elliptical sections 3, 4 and 5, which progressively approach circularity of cross-section.

Joining this unit is a round waveguide section 6 having a pair of shorting rods 7 extending diametrically across it in a horizontal direction near the input end. These bars are parallel and are spaced by a quarter-wavelength. Near the other end a shunt arm 10 terminating in a dissipative load 11 extends from the bottom of this section. Directly above it is a capacitive pin 12.

The section 6 is joined to a rotatable polarizing section 13 of round waveguide, which contains a diametrically and axially extending dielectric polarizing slab 14. The slab is designed to be well matched to any polarization. This is accomplished by the deep V-grooves 15 in its ends, the edges of these grooves being bevelled. The polarizing section may be rotated by hand or mechanical means may be provided for the purpose, if desired, to provide either vertical or circular polarization.

All of the sections heretofore described may be provided with conventional choke flanges to minimize losses.

In juxtaposition to the polarizing section is a section 16 of square waveguide. A pair of ridges 17 extend from the top and bottom surfaces of this section, each terminating in a face which is curved in an arc of a circle.

The section 16 is joined to the throat 20 of a feed horn 21. The structure of the horn is more clearly shown in FIG. 2. The proportions of the horn shown were selected to provide a primary feed pattern having a ten db beamwidth of 66° in the vertical and 98° in azimuth. The horn is provided with fins 22 for the purpose of providing the same horn pattern regardless of polarization, in a manner which will be later described.

In the operation of the system described, the incoming energy in the section 1 in the $TE_{01}$ mode is converted into the $TE_{11}$ mode in passing through the three step transition 2. The $TE_{11}$ wave is so oriented that its electric vector is vertical. The triple step configuration is utilized to provide greater power handling capability and a wider band transition than could be attained by a single step.

The two horizontal shorting bars 7 act as mode aligners, since they will reflect any horizontally polarized signal but will allow vertically polarized waves to propagate. The rods being placed one-quarter guide wavelength apart, their reactances will cancel. The vertically polarized wave is incorrectly oriented for coupling into the load section 10 and is therefore propagated into the polarizing section 13. The capacitive pin 12 located opposite the load section is required to match the susceptance of the load section.

The polarizing section 13 may be oriented so that the plane of symmetry of the dielectric slab 14 is either horizontal or at an angle of 45° to the vertical. In the first case the vertically polarized $TE_{11}$ wave is propagated without a change in polarization. In the latter case it will be resolved into two $TE_{11}$ like modes of equal amplitude, one polarized in parallel with, and one perpendicular to, the plane of symmetry of the slab. The dielectric has a greater effect on the guide wavelength of the mode which is polarized in parallel with the plane of symmetry of the slab than on the wavelength of the mode which is polarized orthogonally with respect to that plane. If the length of the slab is correctly chosen, a 90° phase shift will result between the two modes. This results in circular polarization since two equal amplitude waves, which are 90° out of time and space phase, are present. In passing into the square ridged section 16, each of these waves is converted into two modes, one vertically and one horizontally polarized. These modes are transmitted through the ridged section and radiated by the horn 21 as a circularly polarized wave. The ridges 17 act as a differential phase shifter to compensate for the differential phase shift caused by the unequal side dimensions of the horn which, as is clearly apparent in FIG. 2, has greater vertical than horizontal dimensions. This difference in dimensions is provided in order to produce different beamwidths in azimuth and elevation. It is necessary that the relative phase shift of any components of the circularly polarized wave be $N\pi$ radians, where N is any integer including zero. If this requirement is not met the transmitted wave will not be circularly polarized even though the wave leaving the polarizing section 13 is.

In attempting to broadband the polarizing section 14, it was discovered that satisfactory results could not be obtained unless the input end of the feed system was matched for all polarizations. The necessity for this arises from the fact that reflections in the horn cause a portion of the circularly polarized wave to be reflected back through the dielectric slab. This wave will be elliptically polarized and may be analyzed as being composed of two circularly polarized waves with opposite sense of rotation. The wave which is reflected with the same sense of rotation as that transmitted will be converted to a $TE_{11}$ mode in the round waveguide 6. This mode will be vertically polarized and will be propagated into the rectangular waveguide 1. The wave which is reflected with the opposite sense of rotation to that transmitted will be converted into a $TE_{11}$ mode which is horizontally polarized. This wave is reflected by the triple step transition means 2, since it acts as a waveguide below cut-off. This horizontally polarized wave is converted to a circularly polarized wave by passing through section 13 again. The sense of rotation is opposite to that of the original wave and an elliptically polarized wave is, therefore, produced. This may be corrected for by adjusting the polarizing section to produce an elliptically polarized wave which, when combined with the reflected wave, will produce a circularly polarized wave. This method of correction, however, produces a system which is very sensitive to frequency changes.

The shunt arm 10 terminating in the load 11 operates to correct this situation by coupling any horizontally polarized energy out of the round waveguide 6. This results in establishing a match for reflected waves, regardless of their polarization. The horizontal shorting bars 7 act as a short-circuit to horizontally polarized waves. They are preferable to dependence on the triple step transition means since its effective short-circuiting ability is frequency sensitive.

The capacitive pins 19, located in the side walls at the horn end of section 16, are necessary to match the horn for horizontal polarization.

The novel horn structure has been provided in order to produce horn patterns which are the same, regardless of polarization, in spite of a beamwidth requirement which is less in the vertical direction than in azimuth. This result is not possible with the conventional feed horn, since for a given aperture the beamwidth will be much wider if the aperture is in the H plane, than if it is in the E plane. The desired result is made possible by the introduction of the fins 22 into the horn on all four sides thereof. These fins effectively change the aperture of the feed system as a function of polarization. The fins act as waveguides beyond cut-off when the electric field is parallel to them. As an approximation, the fin height is selected so that the diametrical distance between fins is equal to the desired aperture in that direction. In practice, this height must be modified slightly due to the effect of the fins in the other plane. The fins are rounded to increase the power handling capabilities of the horn.

The differential phase shift obtained in the section 16 is due to the presence of the ridges 17. The ridges have the form of the arc of a circle and thus, have a very low standing wave ratio and produce a differential phase shift as a function of frequency which closely approximates and cancels that of the horn.

Conventional choke type flanges should be used at the junctions of the sections 6 and 13 with adjacent sections.

What is claimed is:

1. A feed system for a microwave antenna comprising a rectangular waveguide feeding energy into said system, a section of circular waveguide, means converting the energy fed by said rectangular waveguide into vertically polarized energy in said circular waveguide, means in said circular waveguide near said converting means for reflecting only horizontally polarized energy, means in said circular waveguide remote from said converting means for absorbing only horizontally polarized energy therefrom, said circular waveguide section feeding into a polarizing section of circular waveguide having therein means converting said vertically polarized energy into circularly polarized energy, a horn and means feeding energy from said polarizing section to said horn, the last named means comprising a waveguide section of square cross-section and phase shifting protuberances extending inwardly from the top and bottom surfaces thereof.

2. A feed system for a microwave antenna comprising a rectangular waveguide feeding energy into said system, a section of circular waveguide, means converting the energy fed by said rectangular waveguide into vertically polarized energy in said circular waveguide, means in said circular waveguide near said converting means for reflecting only horizontally polarized energy, means in said circular waveguide remote from said converting means for absorbing only horizontally polarized energy therefrom, said circular waveguide section feeding into a polarizing section of circular waveguide having therein means converting said vertically polarized energy into circularly polarized energy, a horn of rectangular cross-section, each of the side walls thereof having a plurality of identical, equally spaced, parallel fins extending inwardly therefrom to define the aperture of said horn as a function of the polarization of the energy therein, and means feeding energy from said polarizing section to said horn, the last named means comprising a waveguide section of square cross-section and differential phase-shifting means therein so dimensioned as to produce in energy fed thereto from said polarizing section a differential phase shift equal and opposite to that applied to said energy in passing through said horn.

3. A feed system for a microwave antenna comprising a rectangular waveguide feeding energy into said system, a section of circular waveguide, means converting the energy fed by said rectangular waveguide into vertically polarized energy in said circular waveguide, a pair of parallel conductive rods extending horizontally and diametrically of said circular waveguide near said converting means, said rods being spaced by a quarter wavelength of the energy in said waveguide, a shunt arm for said circular waveguide comprising a rectangular waveguide opening into said circular waveguide adjacent the end thereof remote from said converting means, with its longer lateral dimension parallel to the axis of said circular waveguide, said shunt arm terminating in a dissipative load means, said circular waveguide section feeding into a polarizing section of circular waveguide having a slab of dielectric material positioned with its plane of symmetry extending diametrically and axially thereof, said plane of symmetry extending at an angle of forty-five degrees to the vertical, a horn, and means feeding energy from said polarizing section to said horn, the last named means comprising a waveguide section of square cross-section and phase shifting protuberances extending inwardly from the top and bottom surfaces thereof.

4. A feed system for a microwave antenna comprising a rectangular waveguide feeding energy into said system, a section of circular waveguide, means converting the energy fed by said rectangular waveguide into vertically polarized energy in said circular waveguide, a pair of parallel conductive rods extending horizontally and diametrically of said circular waveguide near said converting means, said rods being spaced by a quarter wavelength of the energy in said waveguide, a shunt arm for said circular waveguide comprising a rectangular waveguide opening into said circular waveguide adjacent the end thereof remote from said converting means, with its longer lateral dimension parallel to the axis of said circular waveguide, said shunt arm terminating in a dissipative load means, said circular waveguide section feeding into a polarizing section of circular waveguide having a slab of dielectric material positioned with its plane of symmetry extending diametrically and axially thereof, said plane of symmetry extending at an angle of forty-five degrees to the vertical, a horn of rectangular cross-section, each of the side-walls thereof having a plurality of identical, equally spaced, parallel fins extending inwardly therefrom to define the aperture of said horn as a function of the polarization of the energy therein, and means feeding energy from said polarizing section to said horn, the last named means comprising a waveguide section of square cross-section and differential phase-shifting means therein so dimensioned as to produce in energy fed thereto from said polarizing section a differential phase shift equal and opposite to that applied to said energy in passing through said horn.

5. A precipitation clutter immune microwave system comprising means for transmitting vertically polarized microwave energy in one direction in a rectangular waveguide, a circular waveguide section, means for coupling energy between said rectangular guide and said circular guide with vertical polarization, polarization converting means in said circular guide for converting energy propagated in said one direction from vertical polarization to circular polarization of one sense and energy propagated in the opposite direction from circular polarization of said one sense to vertical polarization and circular polarization of the opposite sense to horizontal polarization, a horn antenna coupled to said circular waveguide for transmitting and receiving circularly polarized energy, power absorbing means positioned between said rectangular guide and said polarization converting means in said circular guide for dissipating substantially all of the energy from said antenna which is converted to horizontal polarization, and means coupled to said rectangular waveguide for utilizing only the energy from said antenna which is converted to vertical polarization.

6. A precipitation clutter immune microwave system comprising means for transmitting vertically polarized microwave energy in one direction in a rectangular waveguide, a circular waveguide section, means for coupling energy between said rectangular guide and said circular guide with vertical polarization, polarization converting means in said circular guide for converting energy propagated in said one direction from vertical polarization to circular polarization of one sense and energy propagated in the opposite direction from circular polarization of said one sense to vertical polarization and circular polarization of the opposite sense to horizontal polarization, a horn antenna coupled to said circular waveguide for transmitting and receiving circularly polarized energy, a branch waveguide coupled to said circular guide positioned between said rectangular guide and said polarization converting means for coupling substantially all of the horizontally polarized energy out of said circular guide, a dissipative load in said branch waveguide for absorbing said horizontally polarized energy, and means coupled to said rectangular waveguide for utilizing only the energy from said antenna which is converted to vertical polarization.

7. A radar feed system comprising a rectangular waveguide providing the transmission path for both transmitted and received $TE_{01}$ energy utilized by said radar system, a circular waveguide section, a transition section connecting said rectangular waveguide to one end of said circular waveguide and converting between $TE_{01}$ energy in said rectangular guide and $TE_{11}$ energy in said circular guide, a dielectric plate in said circular waveguide inclined at 45° to the maximum electric vector of said $TE_{11}$ energy and of length to convert said $TE_{11}$ energy into circularly polarized energy, a branch waveguide connected to said circular guide between said transition section and said plate and coupled thereto for removing all energy having polarization orthogonal to said $TE_{11}$ energy therein, a load for dissipating all energy coupled into said branch waveguide, and a horn antenna coupled to the other end of said circular waveguide section for radiating and receiving circularly polarized energy, said elements cooperating to utilize in said rectangular waveguide only echo signal components derived from the asymmetry of reflecting objects.

8. A system according to claim 5 in which said horn comprises a horn of rectangular cross section, and includes a plurality of parallel spaced fins projecting inwardly from opposed side walls to change the aperture of said feed system as a function of polarization to maintain the radiation pattern independent of polarization.

9. The system of claim 8 in which a plurality of parallel spaced fins project inwardly from each side wall of said horn.

References Cited in the file of this patent
UNITED STATES PATENTS

| | | |
|---|---|---|
| 2,316,151 | Barrow | Apr. 13, 1943 |
| 2,317,464 | Katzin | Apr. 27, 1943 |
| 2,425,345 | Ring | Aug. 12, 1947 |
| 2,607,849 | Purcell et al. | Aug. 19, 1952 |
| 2,644,930 | Luhrs et al. | July 7, 1953 |
| 2,650,985 | Rust et al. | Sept. 1, 1953 |
| 2,735,092 | Brown | Feb. 14, 1956 |